(12) United States Patent
Kyperountas et al.

(10) Patent No.: US 7,274,940 B2
(45) Date of Patent: Sep. 25, 2007

(54) METHOD AND SYSTEM FOR DETERMINING A LOCATION OF A PLURALITY OF UNITS USING SUB-DIVIDED UNIT GROUPINGS

(75) Inventors: Spyros Kyperountas, Coral Springs, FL (US); Oleg Andric, West Palm Beach, FL (US); Neiyer S. Correal, Cooper City, FL (US); Jian Huang, Coral Springs, FL (US); Feng Niu, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 115 days.

(21) Appl. No.: 10/747,378

(22) Filed: Dec. 29, 2003

(65) Prior Publication Data
US 2005/0143101 A1   Jun. 30, 2005

(51) Int. Cl.
*H04Q 7/20* (2006.01)
(52) U.S. Cl. .................................. 455/456.1
(58) Field of Classification Search ............ 455/456.1, 455/444, 446; 370/338, 316; 342/450; 709/224
See application file for complete search history.

(56) References Cited

U.S. PATENT DOCUMENTS

| | | | |
|---|---|---|---|
| 6,236,662 B1 * | 5/2001 | Reilly .................... | 370/462 |
| 6,473,038 B2 * | 10/2002 | Patwari et al. ............... | 342/450 |
| 6,807,158 B2 * | 10/2004 | Krishnamurthy et al. ... | 370/316 |
| 6,859,831 B1 * | 2/2005 | Gelvin et al. ............... | 709/224 |
| 6,980,524 B1 * | 12/2005 | Lu et al. ..................... | 370/254 |
| 2003/0012168 A1 * | 1/2003 | Elson et al. ................. | 370/338 |

OTHER PUBLICATIONS

Andreas Savvides, Chih-Chieh Han, and Mani B.Strivastava; "Dynamic Fine-Grained Localization in Ad-Hoc Networks Of Sensors"; pp. 166-179.

Andreas Savvides, Heemin Park, and Mani B. Srivastava; The Bits and Flops of the N-hop Multilateration Primitive For Node Localization Problems; 10 pages.

* cited by examiner

*Primary Examiner*—Duc M. Nguyen
*Assistant Examiner*—Chuck Huynh
(74) *Attorney, Agent, or Firm*—Lawrence J. Chapa (57) ABSTRACT

A method and system is provided for determining a location for each of a plurality of units, which are sub-divided into more than one sub-net groupings, that each include two or more units. Within each sub-net grouping, measured range information between units within the sub-nets and one or more reference units is gathered in at least a selected one of the units. The selected one of the units then estimates a location for each of the units, which minimizes any error in the measured ranges between the units in each of the corresponding sub-nets.

21 Claims, 6 Drawing Sheets

METHOD AND SYSTEM FOR DETERMINING A LOCATION OF A PLURALITY OF UNITS USING SUB-DIVIDED UNIT GROUPINGS

FIELD OF THE INVENTION

The present invention relates generally to the determining a location of a plurality of units operating within a network, and more particularly, to the distribution of the processing associated with the determination through a sub-division of the plurality of units into a plurality of sub-nets, which are adapted to separately evaluate the location of the plurality of units in each of the corresponding sub-nets.

BACKGROUND OF THE INVENTION

There are instances in which it would be desirable to track and or estimate the location of individual units within a network, including multi-hop and/or ad-hoc networks. In at least some of these instances, some of the more traditional approaches, such as approaches based upon triangulation/trilateration, may be unavailable. For example, for at least some of the units there may be an insufficient number of range measurements relative to one or more reference units, whose locations are known, to enable a unit to be located to be able to determine its location.

However, despite not having a sufficient number of range measurements relative to one or more reference units for any particular one or more units, in some instances a location estimation can be determined based upon a known relationship of a group of units relative to one another, as well as the relationship between at least some of the units in the group relative to one or more reference units. In at least some instances, an iterative approach may exist for estimating a location for a plurality of units forming a multi-hop network. One such example includes Patwari et al., U.S. Pat. No. 6,473,038.

In at least some iterative approaches, the various distance/range information is gathered in a centralized location, where a set of locations are initially estimated, and a corresponding error value is determined for the set of locations. The location estimates will be iteratively adjusted until the corresponding error value is minimized. In at least some instances an error value will be based upon the accumulated differences associated with the distance between units relative to the estimated locations, and the measured distance between units using one or more measured ranging techniques.

However as the number of units in the network increases, the volume of information that needs to be collected at the central unit where the location estimates are to be determined increases. Still further, the distance measured in the number of hops that some of the information will need to travel to be received at the central unit where the location estimates are determined will also often similarly increase as the number of units in the network increases. In some instances, the number of hops can be minimized to the extent that the particular unit where the location estimates are determined is selected as being one of the units located toward the center of the units. Each hop generally introduces a corresponding delay or latency associated with gathering the associated range information at the unit where the location estimates are determined, as well as representing an additional unit that the information needs to travel through in order to be received by the unit where the location estimates are determined.

In addition to delays associated with multiple hops, traffic densities in and around the unit where the location estimates are determined are often heightened and in some instances can result in one or more truffle bottlenecks. Furthermore, this can cause non-uniform energy consumption to occur. Further yet, the location computational time exponentially increases with every additional blindfolded unit (i.e. unit whose location is to be determined) in the network.

The present inventors have recognized that subdividing a plurality of units, whose locations are to be determined, into a plurality of sub-nets can generally be done without adversely affecting the network's ability to determine the location of the units. Furthermore, the determination of the locations of the units can then be distributed between multiple units that are associated with each of the sub-nets.

SUMMARY OF THE INVENTION

The present invention provides a method for determining a location of a plurality of units, each unit being communicatively coupled to at least some of the other plurality of units, wherein at least some of the plurality of units are in communication range with one or more reference units which have a location that is at least one of determined and known. The method includes sub-dividing the plurality of units into a plurality of sub-nets, wherein each sub-net includes two or more units. Range information between each of the units in the sub-net and the other units in the sub-net, which are in communication range with the unit, and range information between any reference units and at least one of the units in the sub-net within communication range of the corresponding reference unit, in each of the sub-nets, is then measured. The respective measured range information is then gathered in at least a selected one of the units associated with each of the sub-nets.

In the at least selected one of the units in each of the sub-nets in which the measured range information was gathered, a location for each of the units in each of the sub-nets is estimated, which minimizes any error in the measured ranges between the units within communication range in each of the sub-nets and the measured range between any of the reference units and the corresponding units in the sub-net within communication range of at least one of the reference units.

In at least one embodiment, sub-dividing the plurality of units into a plurality of sub-nets includes identifying communication pathways between the units having at least one of communication traffic volumes and communication traffic latency, associated with location determination, which exceeds a corresponding predetermined threshold and includes the communication traffic volumes associated with location determination for at least two units, and defining a sub-net boundary for a new sub-net across the identified communication pathway.

In at least a further embodiment, defining a sub-net boundary for a new sub-net includes defining a centralized processor as the at least selected one of the units for the new sub-net from among the two or more units in the new sub-net.

The present invention further provides a system for determining the location of a plurality of units in a multi-hop network, each unit being communicatively coupled to at least some of the other plurality of units, wherein at least some of the plurality of units are in communication range with one or more reference units, whose location is at least one of determined and known. The system includes a plurality of sub-nets, each sub-net including a plurality of units having a transceiver for sharing information including location information with other units. At least one of said units associated with each of said sub-nets includes a centralized processor adapted for receiving range information from each of the units within the corresponding sub-net in one or more hops, and adapted for estimating the location of each of the units in the corresponding sub-net.

These and other features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
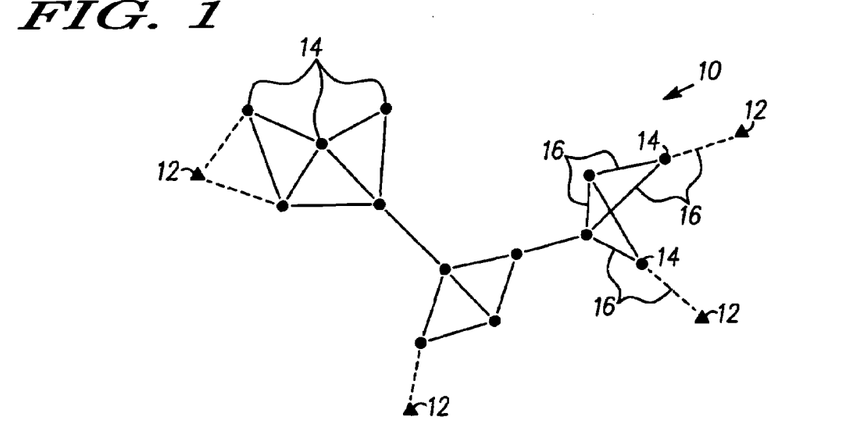
FIG. 1 is a partial spatial overview diagram illustrating an exemplary spatial relationship between nearby members of at least a portion of a network of units.

FIG. 1 illustrates a diagram illustrating an exemplary spatial relationship between nearby members of at least a portion of a network of units 10, including reference units 12, illustrated as triangles, and blindfolded units, illustrated as circles, at least a couple of which are associated with a reference number 14. Generally, a reference unit 12 corresponds to a unit, whose location is known, and a blindfolded unit 14 represents one of one or more units for which the unit's location would need to be determined and/or estimated.

Each unit, generally, communicates with other nearby units. In at least one embodiment, this is facilitated via a transceiver and corresponding antenna, which are associated with each of the units, and which support wireless communication between the units within communication range of one another. Units within communication range of one another are highlighted by a line 16, either solid or dashed, which is present between the pair of units, where, similar to the blindfolded units, only some of lines corresponding to a communication connection are associated with the respective reference number.

Figure 2:
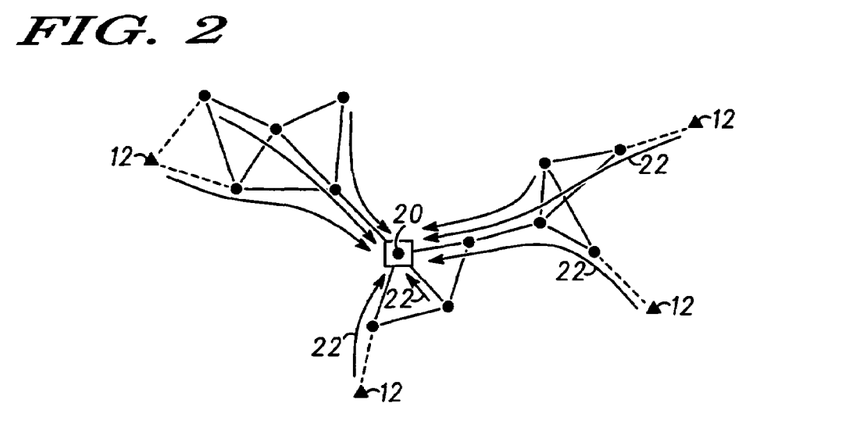
FIG. 2 is the partial spatial overview diagram shown in FIG. 1 further illustrating an exemplary set of communication paths for forwarding information to a centralized unit.

In order to facilitate an estimation of the location of the one or more blindfolded units 14, at least one of the units is selected to process the available information, for purposes of determining a location estimate for each of the associated blindfolded units. In some instances, not all of the units may be equipped with the processing characteristics necessary to compute a location estimate, and therefore, there may be limitations as to which units are selected. FIG. 2 illustrates the exemplary spatial relationship of the network of units, shown in FIG. 1, where a selected one of the units 20 is highlighted, which is assumed to have the necessary processing characteristics for determining the location estimates.

In order to perform the processing associated with estimating a location, information associated with the relationship of proximate units, such as range information is gathered at the selected unit 20. Several arrows illustrating potential pathways 22 associated with gathering the information from other nearby units are illustrated, only some of which are associated with the noted reference number. In some instances, the path 22 is relatively short. In other instances, the communication path 22 extends across multiple hops. Where the path extends along multiple hops, there can be a larger delay or latency associated with the time that the information arrives at the selected unit. Often times each hop will have a corresponding delay, which is cumulative relative to the subsequent sequential hops.

Furthermore, in some instances, a communication connection between units will support multiple communication paths. In other words, some nodes will act as a relay for other nodes further away from the selected node. In other instances, a communication connection between units will not be used, where other communication paths having an alternative or more direct route are available. Where multiple communication paths share a common communication connection, there can be an information bottleneck, which may affect the speed with which the information reaches the selected unit. However, the ultimate bottleneck is generally often associated with the ability of the selected unit to receive the information, which in the illustrated embodiment where there is a single selected unit, corresponds to a point of convergence of all of the communication paths.

Figure 3:
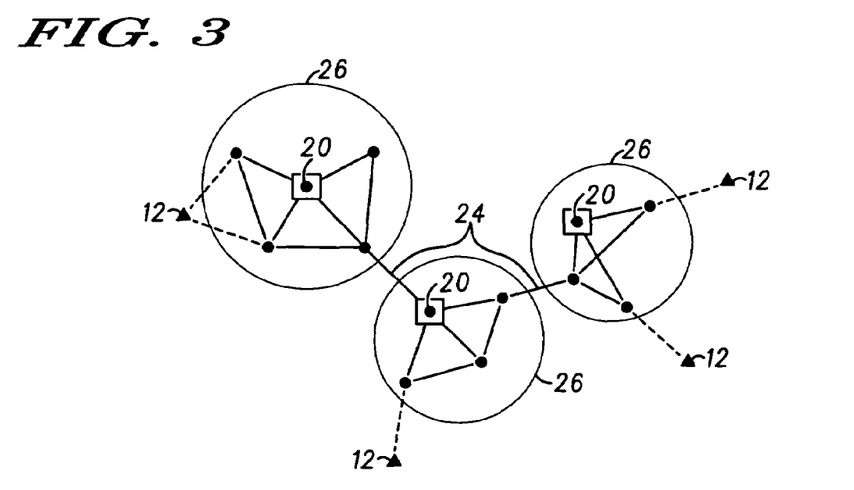
FIG. 3 is the partial spatial overview diagram shown in FIG. 1 further illustrating the units sub-divided into multiple sub-nets, in accordance with at least one embodiment of the present invention.

By sub-dividing the units into a plurality of sub-nets, and selecting a unit associated with each of the sub-nets to determine a location estimate for each of the units in the sub-net, the processing can be at least partially distributed. Furthermore, the amount of information that needs to be gathered in each of the selected units can be reduced. FIG. 3 illustrates the partial spatial overview diagram shown in FIG. 1 further including the units sub-divided into multiple sub-nets, in accordance with at least one embodiment of the present invention.

Communication connections between units, which include multiple communication paths, can highlight points of connection in the network, which have a limited number of paths between multiple groups of units. Or in other words, the limited number of paths between multiple groups of units highlights two groups of units on opposite ends of the communication path, that have a limited amount of direct contact with units of the other group. The limited number of pathways can highlight natural break points, where it might be convenient to sub-divide the network. In the illustrated embodiment, two such break points 24 were identified, and three sub-nets 26 were formed. Correspondingly, additional units 20 for processing the range information associated with each of the sub-nets were also selected.

While it is not required for each of the selected units 20 associated with each of the sub-nets 26 to be members of the sub-net 26, generally, because the range information for the units in the sub-net 26 needs to be gathered at the selected unit 20, for purposes of minimizing the amount of communication between units and the distance (i.e. number of hops) each communication will travel, the selected unit 20 relative to a particular sub-net 26 is generally selected from the units in the particular sub-net 26. In some instances, it may be possible that a reference unit 12 could function as a selected unit 20.

Once the sub-nets 26 have been formed, generally, the unit at the opposite end of the communication connection corresponding to the break point 24, which is outside of the sub-net 26, is treated as a reference unit for purposes of estimating a location of each of the units in the sub-net 26. However, because the location of this unit may similarly not be known, and/or may be simultaneously being estimated in connection with the location estimates of another sub-net 26, as the estimate of the location of this unit is updated, the information is forwarded to the nearby sub-net 26, in order that the nearby sub-net can make location estimates based upon the best available information.

Figure 4:
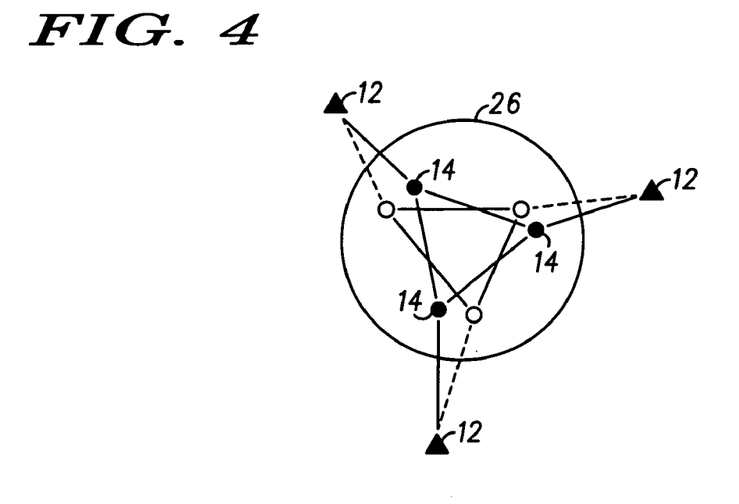
FIG. 4 is a partial spatial overview diagram of an exemplary sub-net and corresponding nearby reference units, which illustrates a pair of sets of estimated locations.

FIG. 4 illustrates an example of two sequentially iterative estimates of locations within a sub-net 26, which attempts to minimize the difference between the measured ranges between units and calculated ranges between units, based upon estimated locations. As each new location or set of locations is estimated, a determination is made as to whether the calculated ranges between the units better matches the measured ranges between the units. As with some iterative approaches, each subsequent location estimate may be the result of a formula or function, which takes into account the previously determined difference(s).

As noted previously, by forming sub-nets 26, which separately determine a location estimate for each of the units within the respective sub-net 26, the amount of information and the delay associated with gathering the information can be reduced, which in turn minimizes the complexity of the calculations associated with estimating a location for each of the units in each of the sub-nets 26. Furthermore, the calculation in each of the sub-nets 26, in most instances, can proceed in parallel. In this way, an alternative approach for determining a location of a plurality of units in a network, which in many instances will represent an improvement, can be realized.

Figure 5:
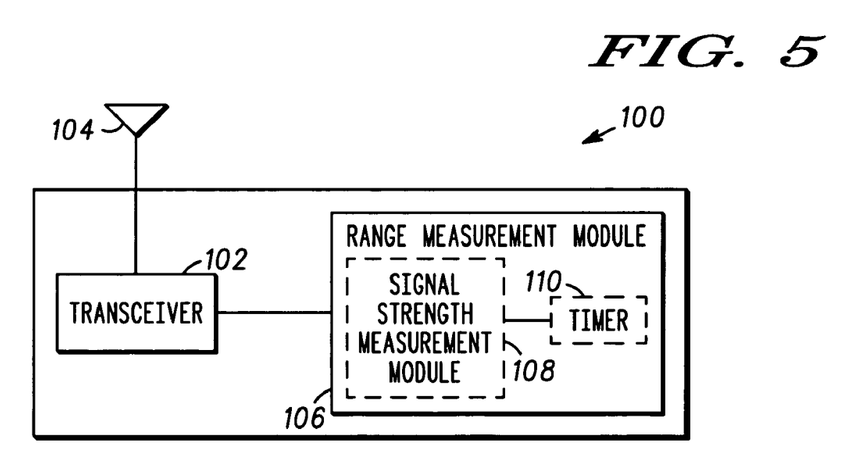
FIG. 5 is a block diagram of an exemplary unit to be located.

FIG. 5 illustrates a block diagram of an exemplary unit 100, which in at least some instances will correspond to some of the units to be located 14 illustrated in FIGS. 1-4. As noted previously, in accordance with at least some embodiments, the units within a network 10 will communicate wirelessly. To facilitate such a wireless communication connection, in at least some instances, the unit 100 can include a transceiver 102 and an antenna 104. One skilled in the art will readily recognize that such a block structure and/or arrangement will support various different types of wireless communications. Still further one skilled in the art will recognize other arrangements, which could alternatively support other types of wireless communication, could be implemented without departing from the teachings of the present invention.

In at least the illustrated embodiment, the exemplary unit 100, additionally include a range measurement module 106, which allows for a measured range determination between other units within communication range. As noted previously, several different methods could be incorporated for determining range, at least a couple of examples include a range measurement based upon a received signal strength indication, time of arrival estimate, angle of arrival estimate, and/or a time difference of arrival estimate. For purposes of supporting the determination of a received signal strength indication, the range measurement module 106 could include a signal strength measurement module 108. Alternatively or additionally, the range measurement module 106 could include a timer 110, which could be used in connection with determining a time of arrival estimate or a time difference of arrival estimate. The measured range information, is then used to determine a location estimate after the information is gathered in the unit 20, which is selected to estimate the location of the units in the sub-net 26.

In at least some instances, the range measurement module 106 may be implemented as one or more sets of prestored instructions, which are executed in a microprocessor. In other instances, the modules may be implemented using various electronic circuit elements. The block diagram illustrated in FIG. 5 may similarly correspond in some instances to one or more of the reference units 12, where it may be desirable for the reference units 12 to similarly be able to measure a range between nearby units.

Figure 6:
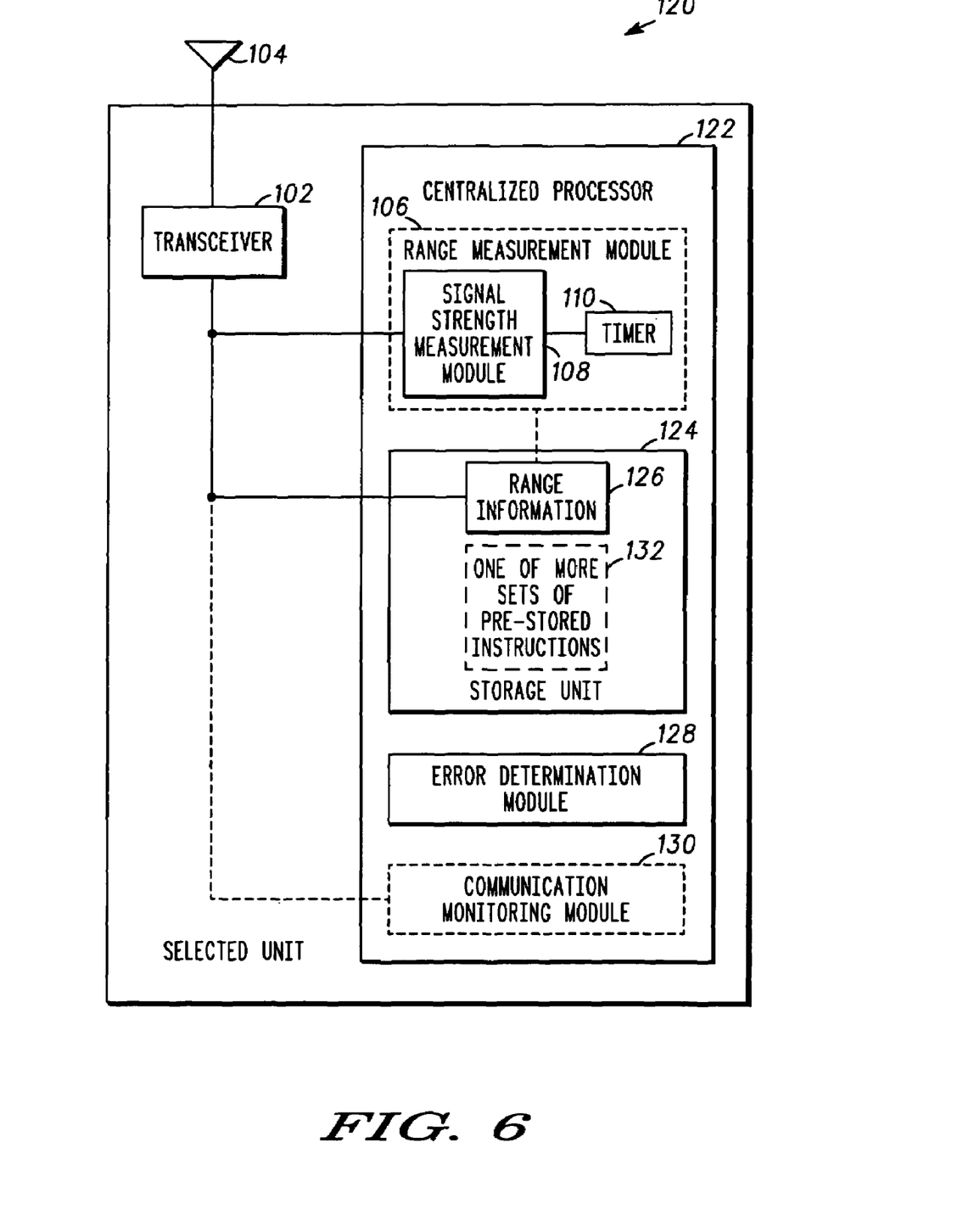
FIG. 6 is a block diagram of a unit, in accordance with at least one embodiment of the present invention, which is selected to determine a location estimate of the one or more units associated with at least one of the sub-nets, such as one or more of the units to be located illustrated in FIG. 5.

FIG. 6 illustrates a block diagram of a unit 120, in accordance with at least one embodiment of the present invention, which is selected to determine a location estimate of the one or more units associated with at least one of the sub-nets, such as one or more of the units 100, illustrated in FIG. 5. Similar to the unit 100 illustrated in FIG. 5, the selected unit 120 includes a transceiver 102, antenna 104, and range measurement module 106. In the illustrated embodiment, the range measurement module 106 is optionally implemented as part of a centralized processor 122. In some instances the selected unit 120 may be a unit, which is not included among the units to be located 14 as part of a corresponding sub-net 26 or similarly may not be an associated reference unit. In these or similar instances, it may not be necessary for the selected unit 120 to include a range measurement module 106.

The centralized processor 122 includes a storage unit 124, which is adapted for storing received range information 126. The storage unit 124 can take the form of one or more different types of storage including both volatile and non-volatile memory, at least a couple of examples including one or more types of semi-conductor memories (i.e. ROM, EPROM, RAM or EEPROM, etc.). Still further, the different types of storage could include auxiliary storage, such as fixed or removable media including magnetic disk or optical disc drives. The centralized processor 122 additionally includes an error determination module 128, which is adapted for determining a minimized error value associated with a set of estimated location values for the one or more units to be located 14, based upon the measured range information 126.

The centralized processor 122, optionally, can further include a communication monitoring module 130, which is adapted to monitor communications between units for determining potential desirable break points 24, where the network could be beneficially sub-divided. As noted previously, both latency and traffic volume of the communication traffic associated with range information 126 could be monitored by the communication monitoring module 130 for purposes of making a decision relevant to potentially sub-dividing the network 10.

Similar to the range measurement module 106, described in connection with the unit 100 illustrated in FIG. 5, the error determination module 128, communication monitoring module 130 and/or the range measurement module 106 could be implemented as one or more sets of prestored instructions 132 executed by one or more microprocessors or alternatively implemented using various circuit elements. One skilled in the art will readily recognize that still further alternative implementations are possible without departing from the teachings of the present invention.

Figure 7:
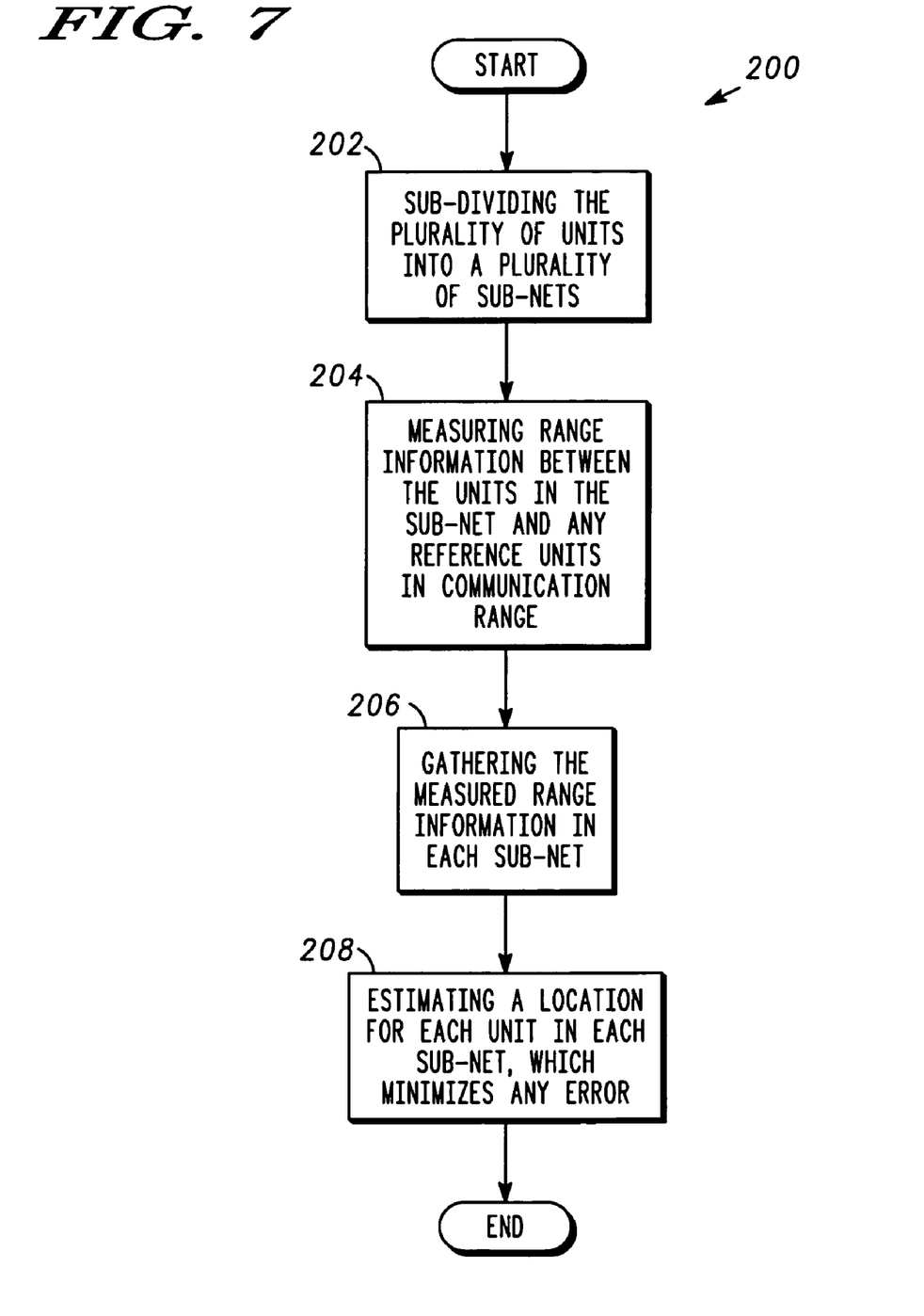
FIG. 7 is a flow diagram of a method for determining a location of a plurality of units, in accordance with at least one embodiment of the present invention.

FIG. 7 illustrates a flow diagram of a method 200 for determining a location of a plurality of units, in accordance with at least one embodiment of the present invention. The method generally includes sub-dividing 202 the plurality of units into a plurality of sub-nets 26. Additionally, range information between the units 14 in the sub-net 26 and any reference units 12 within communication range is measured 204. The range information is then gathered in a selected unit 20 associated with the corresponding sub-nets 26. A location is then estimated for each unit 14 to be located in each of the sub-nets 26, which minimizes an error value that is based on the range measurements. As noted above, in at least one instance the error value is iteratively determined, where the error value is associated with the sum of a square of the differences between a distance associated with a measured range value and the distance associated with the currently known or estimated location of the units to be located.

Figure 8:
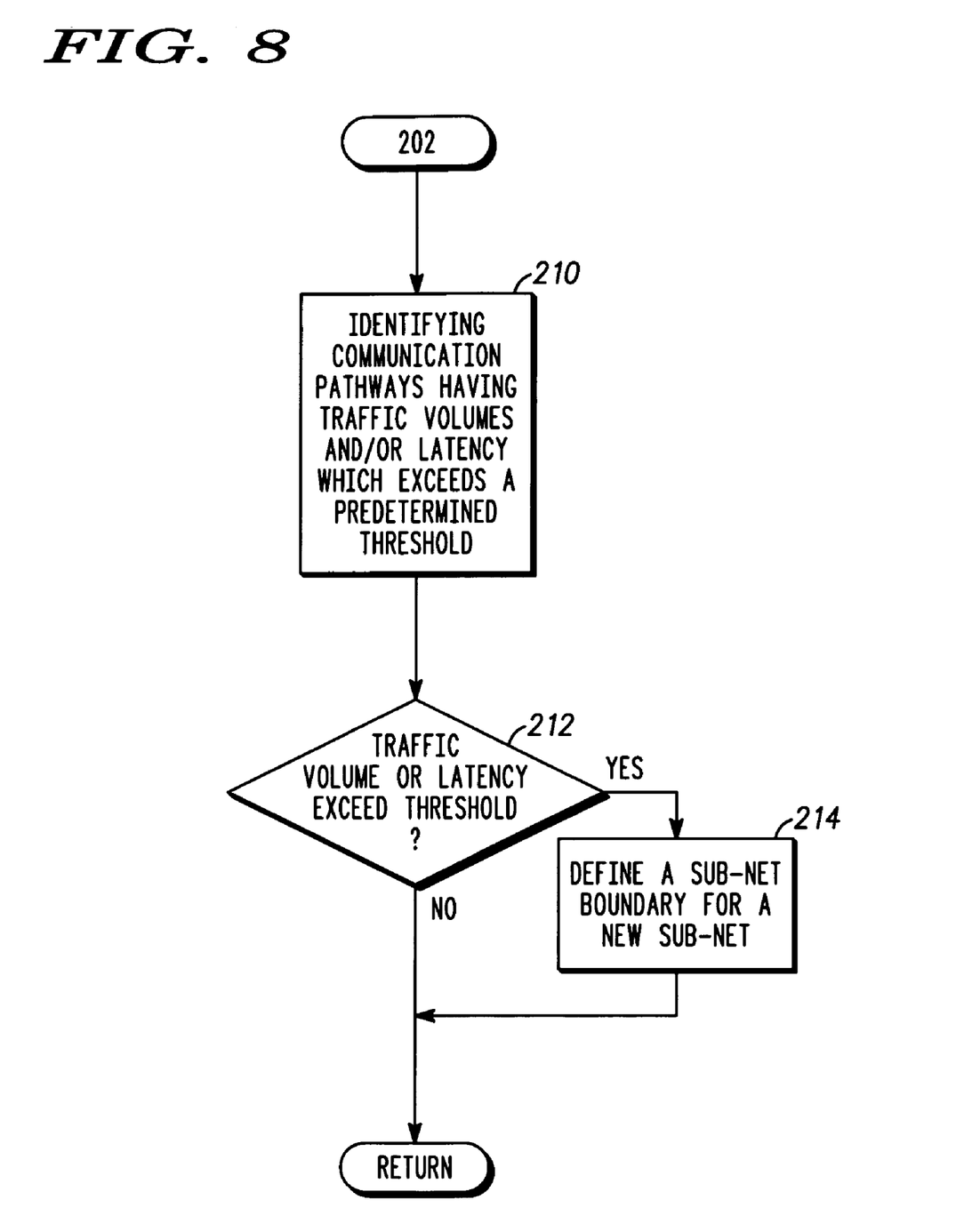
FIG. 8 is a more specific flow diagram of sub-dividing the plurality of units into a plurality of sub-nets, in accordance with at least one embodiment of the present invention.

In connection with at least a further embodiment, FIG. 8 illustrates a more specific flow diagram of sub-dividing 202 the plurality of units into a plurality of sub-nets 26, where the communication pathways are monitored, and communication pathways 16 having traffic volumes and/or latencies, which exceed a predetermined threshold are identified 210. A determination 212 is then made as to whether the traffic volume or latency exceeds a predetermined threshold. If the traffic volume or latency exceeds a predetermined threshold, in connection with any of the communication pathways 16, a sub-net boundary is defined 214 for a new sub-net 26. In this way, the need for different sub-nets can be identified and the boundaries for the different sub-nets 26 can be defined.

Figure 9:
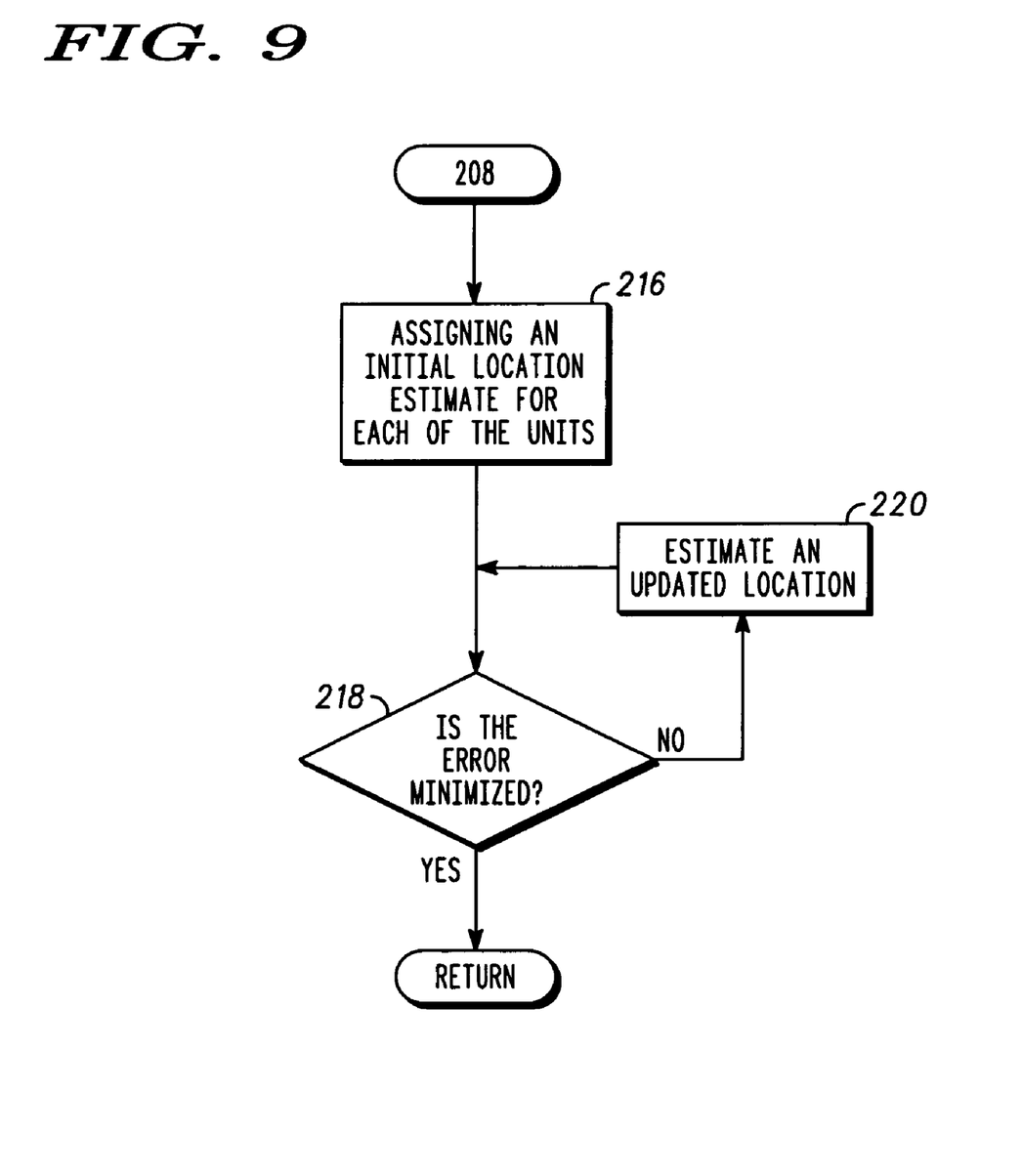
FIG. 9 is a more specific flow diagram of estimating a location for each of the units to be located in at least a corresponding one of the sub-nets, in accordance with at least one embodiment of the present invention.

FIG. 9 is a more specific flow diagram of estimating 208 a location for each of the units to be located 14 in at least a corresponding one of the sub-nets 26, in accordance with at least a still further embodiment of the present invention. Generally, in accordance with this specific embodiment, an initial location estimate for each of the units within each of the corresponding sub-nets 26 is assigned 216, and an error estimate is determined, which is associated with the initial location estimates. Similar to a location determination which can take place in parallel, in each of the sub-nets, a corresponding error estimate and error estimate determination can also be associated with a particular sub-net, and correspondingly be determined in parallel. A determination 218 is then made, as to whether the error has been minimized. In at least some instances, this can be done by investigating potential changes in the location estimates for each of the units, and determining a corresponding change in the associated error value. Any improvements in the corresponding error values are then identified. If a potential improvement is detected, then a new location is estimated 220, which is associated with the improved error value. The process can be repeated until no further improvement in the error value and correspondingly the location estimate appears possible. In this way, a location estimate can be determined, based upon the measured range information, which can allow for separate processing in parallel of different sub-groups of the units 14 to be located.

Generally, the method and system for determining a location for a plurality of units can be used in connection with the location of any number of individual items among a group of items, one such example including the detection of items in a storage location or in a warehouse environment. However, the method and system for determining a location has additional applicability in other networks, wherein the determination of the location of individual elements is desired and a corresponding set of reference units and other non-reference units are available throughout the area to assist in determining a location estimate. At least one such example includes the location of devices such as one or more cellular telephones or other wireless communication devices located within a network.

Still further, the location determination module could be incorporated as part of the equipment for one or more groups of personnel operating in concert within a given area or environment. One such example includes emergency personnel. In this instance the circuitry and/or modules associated with each of the units could be located in one or more of a fire fighter's helmet, jacket, or other piece of equipment.

Further yet, the method and system for determining a location could be made to function with many different forms of wireless communications including communications systems, which use a cellular telephone radio transceiver, a cordless telephone radio transceiver, a wireless LAN connection, a short range radio transceiver, such as a Bluetooth transceiver, an infra-red communication transceiver, or other similar communication device. Still further there is no requirement that the units be completely physically detached from one another, for example, the method and system for determining a location could interact with an installed sprinkler system, which might include wireless transceivers, and/or which might be communicatively coupled to one another, via one or more common communication busses, which traverse the area containing the network.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of determining a location of a plurality of units, each unit being communicatively coupled to at least some of the other plurality of units, wherein at least some of the plurality of units are in communication range with one or more reference units, whose location is at least one of determined and known, said method comprising:

sub-dividing the plurality of units into a plurality of sub-nets, wherein each sub-net includes two or more units;

measuring, in each of the sub-nets, range information between each of the units in the sub-net and the other units in the sub-net, which are in communication range with the unit, and range information between any reference units and at least one of the units in the sub-net within communication range of the corresponding reference unit;

gathering the measured range information in at least a selected one of the units associated with each of the sub-nets;

estimating, in the at least selected one of the units associated with each of the sub-nets in which the measured range information was gathered, a location for each of the units in each of the sub-nets, which minimizes any error in the measured ranges between the units within communication range in each of the sub-nets and the measured range between any of the reference units and the corresponding units in the sub-net within communication range of at least one of the reference units.

2. A method in accordance with claim 1 wherein subdividing the plurality of units into a plurality of sub-nets includes identifying communication pathways between the units having at least one of communication traffic volumes and communication traffic latency, associated with location determination, which exceeds a corresponding predetermined threshold and includes the communication traffic volumes associated with location determination for at least two units; and defining a sub-net boundary for a new sub-net across the identified communication pathway.

3. A method in accordance with claim 2 wherein defining a sub-net boundary for a new sub-net includes defining a centralized processor as the at least selected one of the units for the new sub-net from among the two or more units in the new sub-net.

4. A method in accordance with claim 1 wherein measuring, in each of the sub-nets, range information includes measuring range information between any nearby nodes from a neighboring sub-net and the units in the sub-net within communication range of the corresponding nearby node from the neighboring sub-net.

5. A method in accordance with claim 1 wherein measuring, in each of the sub-nets, range information includes at least one of measuring received signal strength indicator, angle of arrival, time of arrival, time difference of arrival and phase shifts for signals transmitted by one or more of the units.

6. A method in accordance with claim 1 wherein gathering the measured range information in at least one of the units within each of the subnets includes forwarding the estimates to the at least one of the units in one or more hops via one or more units to the at least selected one of the units.

7. A method in accordance with claim 1 wherein estimating, in the at least selected one of the units in each of the sub-nets, a location for each of the units in each of the sub-nets includes minimizing the error in a set of estimated locations for each of the units and the measured range between the units in each sub-net.

8. A method in accordance with claim 7 wherein minimizing the error includes minimizing the sum of the square of the difference between the range, based upon the estimated location, and the measured range.

9. A method in accordance with claim 1 wherein estimating, in the at least selected one of the units in each of the sub-nets, a location for each of the units in each of the sub-nets includes the selected one of the units in each of the sub-nets, assigning an initial location estimate for each of the units in the corresponding sub-net, and iteratively estimating an updated location for each of the units in the corresponding sub-net.

10. A method in accordance with claim 9 wherein, prior to each iterative estimation, the selected one of the units in each of the sub-nets communicates current estimated location information of units in the corresponding sub-net, used in the location estimation of units in other sub-nets, to the selected ones of the units in the other sub-nets.

11. A method in accordance with claim 1 wherein a reference unit for one sub-net includes a unit, whose location is estimated as part of another sub-net.

12. A system for determining the location of a plurality of units in a multi-hop network, each unit being communicatively coupled to at least some of the other plurality of units, wherein at least some of the plurality of units are in communication range with one or more reference units, whose location is at least one of determined and known, said system comprising:

a plurality of sub-nets, which have been formed by subdividing the plurality of units in the multi-hop network, each sub-net including a plurality of units having a transceiver for sharing information including location information with other units, wherein at least one of said units associated with each of said sub-nets includes a centralized processor, which receives range information from each of the units within the corresponding sub-net in one or more hops, and estimates the location of each of the units in the corresponding sub-net, based upon only the range information received from each of the units within the corresponding sub-net, that has been measured by each of the units within the corresponding subnet, which minimizes any error in the measured ranges between the units within communication range in each of the sub-nets and the measured range between any of the reference units and the corresponding units in the sub-net within communication range of at least one of the reference units.

13. A system in accordance with claim 12 wherein each unit includes a range measurement module coupled to the transceiver for detecting the range between each of the units within a sub-net and other units in the sub-net, which are in communication range with the unit, and the range between any reference unit within communication range with the unit.

14. A system in accordance with claim 13 wherein the range measurement module includes a timer for determining the at least one of the time of arrival and time difference of arrival of signals transmitted by other units within communication range.

15. A system in accordance with claim 13 wherein the range measurement module is adapted for measuring the phase shift of signals transmitted by other units within communication range.

16. A system in accordance with claim 13 wherein the range measurement module includes a signal strength measurement module for detecting the received signal strength of signals transmitted by other units within communication range.

17. A system in accordance with claim 13 wherein each of said centralized processors includes an error determination module adapted for determining an error based upon the difference between the computed range calculated from the estimated location of the units within the corresponding sub-net and the received location of any reference units, and a corresponding measured range.

18. A system in accordance with claim 12 further comprising a communication monitoring module for identifying the traffic volume of information associated with location information communicated along the pathways between nodes.

19. A system in accordance with claim 12 wherein at least some of the units are mobile communication devices.

20. A system in accordance with claim 19 wherein at least some of the mobile communication devices are cellular radiotelephones.

21. A system in accordance with claim 12 wherein at least some of the units include equipment used by a group of individuals acting in concert.

* * * * *

UNITED STATES PATENT AND TRADEMARK OFFICE
CERTIFICATE OF CORRECTION

| | | |
|---|---|---|
| PATENT NO. | : 7,274,940 B2 | Page 1 of 1 |
| APPLICATION NO. | : 10/747378 | |
| DATED | : September 25, 2007 | |
| INVENTOR(S) | : Spyros Kyperountas et al. | |

It is certified that error appears in the above-identified patent and that said Letters Patent is hereby corrected as shown below:

In the specification, at Col. 1, line 5 after the title and before the heading "FIELD OF THE INVENTION" the following paragraph should be inserted:

--STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.--

Signed and Sealed this

Nineteenth Day of May, 2009

JOHN DOLL
*Acting Director of the United States Patent and Trademark Office*